United States Patent [19]
Arai et al.

[11] Patent Number: 5,905,836
[45] Date of Patent: May 18, 1999

[54] OPTICAL WAVEGUIDE REDUCTION OPTICAL IMAGE SENSOR

[75] Inventors: Hisako Arai, Kashiwa; Akio Miyata, Abiko; Yutaka Unuma, Matsudo, all of Japan

[73] Assignee: Sharp Kabushiki Kaisha, Osaka, Japan

[21] Appl. No.: 09/024,344

[22] Filed: Feb. 17, 1998

[30] Foreign Application Priority Data

Feb. 26, 1997 [JP] Japan ................................. 9-042626
Jul. 24, 1997 [JP] Japan ................................. 9-198323

[51] Int. Cl.$^6$ ................................................. G02B 6/04
[52] U.S. Cl. ........................ 385/120; 385/116; 385/147
[58] Field of Search .................... 385/120, 115, 385/116, 119, 121, 147, 901

[56] References Cited

U.S. PATENT DOCUMENTS 4,786,139  11/1988  Sedlmayr ................................ 385/120
5,832,168  11/1998  Yenter ................................... 385/147

FOREIGN PATENT DOCUMENTS

4-45654  2/1992  Japan .

Primary Examiner—Phan T. H. Palmer
Attorney, Agent, or Firm—David G. Conlin; William J. Daley, Jr.

[57] ABSTRACT

In an optical waveguide reduction optical image sensor constituted by a polymeric optical waveguide array having a plurality of cores arranged into a one-dimensional array in a cladding substrate, and a photoelectric conversion element array for detecting light propagating through the polymeric optical waveguide array and converting the detected light into an electrical signal, a hollow thermal expansion suppressing member (jig) is mounted on the joint portion between the polymeric optical waveguide array and the photoelectric conversion element array, and the coefficient of linear thermal expansion of the thermal expansion suppressing member in the core array direction of the polymeric optical waveguide array is smaller than that of the polymeric optical waveguide array in the same direction.

14 Claims, 8 Drawing Sheets

OPTICAL WAVEGUIDE REDUCTION OPTICAL IMAGE SENSOR

BACKGROUND OF THE INVENTION

(1) Field of the Invention

The present invention relates to an optical waveguide reduction optical image sensor using optical waveguides, which is used for a one-dimensional read optical system for producing hard copy and the like and is applied to a facsimile, a copying machine, an image scanner, and the like.

(2) Description of the Prior Art

With the recent increase in image readers such as facsimiles, image scanners, and digital copying machines, demands have arisen for a high-performance, compact one-dimensional image sensor for converting image information into an electrical signal. The conventional one-dimensional image sensors include a reduction optical image sensor for reading a focused image by using a reduction optical system such as lenses, and a contact type image sensor for reading a one-to-one focused image by using a one-to-one optical system.

The reduction optical image sensor is inexpensive and capable of high-speed read. However, since this sensor must perform a reduction imaging operation by using lenses, the apparatus size becomes large, resulting in difficulty in reducing the size. In addition, complicated adjustment is required for the optical system of each apparatus.

In contrast to this, the contact type image sensor does not require complicated adjustment for the optical system because the distance from an original to the photoelectric conversion element array is short. However, the size of the photoelectric conversion element array is large, and a complicated electronic circuit is required to drive the photoelectric conversion element array. For this reason, it is difficult to attain a reduction in cost.

Under the circumstances, a reduction image sensor using an optical waveguide array has recently been proposed. This sensor is constituted by a microlens array having a width almost equal to the width of an original surface, an optical waveguide array constituted by a plurality of waveguide cores used to guide light focused by the microlens array and formed in a cladding substrate, and a photoelectric conversion element array for receiving light and converting it into an electrical signal. According to this reduction image sensor using the optical waveguide array, reductions in the cost and size of the apparatus can be realized, and complicated adjustment for the optical system is not required.

Several methods of manufacturing the optical waveguides of such a reduction image sensor using a polymeric material for cores are known.

One method is a sandwich method. According to this method, a polymer precursor material for the cores of waveguides is filled in the groove portions of a pattern substrate made of a polymeric material such as PMMA and having groove patterns, and a flat substrate made of a polymer such as PMMA is brought into tight contact with the groove portions of the pattern substrate. Thereafter, photopolymerization is caused by ultraviolet radiation to form the cores of the optical waveguides made of the polymeric material.

Another method is a vacuum capillary method. According to this method, the pattern surface of a pattern substrate on which groove patterns serving as capillaries are formed is brought into tight contact with a flat substrate to form capillaries. Thereafter, a polymer precursor as a material for the cores of optical waveguides is filled in the capillaries by capillarity, and the polymer precursor is polymerized.

According to these methods, since there is no gap between the pattern substrate and the flat substrate, polymeric optical waveguides having excellent optical waveguide characteristics can be realized, which are free from crosstalk caused by light leaking from the gaps between the cores.

In the reduction optical image sensor using the polymeric optical waveguide array, an original surface is illuminated by an LED in an image read operation, and information on the original surface is guided to the photoelectric conversion elements through the core portions of the optical waveguides, thereby reading image information.

In the above conventional optical waveguide reduction optical image sensor using a polymeric material, if the coefficient of linear thermal expansion of a polymeric material such as PMMA for the polymeric optical waveguide array constituted by a plurality of cores differs from that of the photoelectric conversion element array, a pitch offset occurs between the polymeric optical waveguide array and the photoelectric conversion element array at the joint portion therebetween with a change in temperature. For this reason, a pixel offset occurs, and an output from each photoelectric conversion element deteriorates. An image cannot therefore be properly read.

When such polymeric optical waveguides are to be used, therefore, it is very important to prevent a decrease in image read precision due to a change in temperature.

SUMMARY OF THE INVENTION

The present invention has been made to solve the above problems, and has as its object to provide an optical waveguide reduction optical image sensor which can prevent the occurrence of a pixel offset and can perform a proper image read operation without causing a pitch offset between a polymeric optical waveguide array and the photoelectric conversion element array even with a change in temperature.

The present invention has been made to achieve the above object. The aspects of the present invention will be described below.

According to the first aspect of the present invention, an optical waveguide reduction optical image sensor for reducing light from an original surface by using a polymeric optical waveguide array is characterized in that a joint portion between a polymeric optical waveguide array and a photoelectric conversion element array for detecting light propagating through an optical waveguide and converting the detected light into an electrical signal is fixed with a jig, thereby preventing a pixel offset.

According to the second aspect of the present invention, in the optical waveguide reduction optical image sensor of the above first feature, the jig has a U shape or rectangular shape which covers the joint portion between the polymeric optical waveguide array and the photoelectric conversion element array.

According to the third aspect of the present invention, in the optical waveguide reduction optical image sensor of the above first feature, the jig ensures a gap in a vertical direction.

According to the fourth aspect of the present invention, in the optical waveguide reduction optical image sensor of the above first feature, the jig is formed by using a member having the same coefficient of linear thermal expansion as that of the photoelectric conversion element array.

According to the fifth aspect of the present invention, an optical waveguide reduction optical image sensor comprising a polymeric optical waveguide array having a plurality of cores arranged into a one-dimensional array in a cladding substrate and serving to reduce an image by guiding light reflected by an original surface through the cores, and a photoelectric conversion element array having a plurality of photoelectric conversion elements arranged into a one-dimensional array, which detect light propagating through the photoelectric conversion element array and converts the detected light into an electrical signal, is characterized in that a hollow thermal expansion suppressing member is mounted on a joint portion between the polymeric optical waveguide array and the photoelectric conversion element array, and a coefficient of linear thermal expansion of the thermal expansion suppressing member in a core array direction of the polymeric optical waveguide array is smaller than a coefficient of linear thermal expansion of the polymeric optical waveguide array in the same direction.

According to the sixth aspect of the present invention, in the optical waveguide reduction optical image sensor of the above fifth feature, the thermal expansion suppressing member has a coefficient of linear thermal expansion exhibiting anisotropy, and a coefficient of linear thermal expansion of the thermal expansion suppressing member in a direction substantially perpendicular to the core array direction of the photoelectric conversion element array is substantially equal to or larger than a coefficient of linear thermal expansion of the polymeric optical waveguide array in the same direction.

According to the seventh and eighth aspects of the present invention, in the optical waveguide reduction optical image sensor of the above fifth or sixth feature, a gap is ensured between the polymeric optical waveguide array and the thermal expansion suppressing member in a direction substantially perpendicular to the core array direction of the polymeric optical waveguide array.

According to the ninth and tenth aspects of the present invention, in the optical waveguide reduction optical image sensor of the above fifth or sixth feature, an inner surface of the thermal expansion suppressing member has a tapered shape.

According to the eleventh and twelfth aspects of the present invention, in the optical waveguide reduction optical image sensor of the above fifth or sixth feature, an inner surface of the thermal expansion suppressing member has a corrugated portion.

According to the thirteenth and fourteenth aspects of the present invention, in the optical waveguide reduction optical image sensor of the above fifth or sixth feature, contact surfaces of the polymeric optical waveguide array and the thermal expansion suppressing member are bonded to each other with an adhesive.

The functions and effects of the present invention including these configurations will be described next.

According to the first to fourth aspects of the present invention, since the image sensor has the above configuration, even if the surrounding temperature changes, the expansion of the joint portion between the polymeric optical waveguide array and the photoelectric conversion element array in the longitudinal direction can be suppressed, and a strain in the horizonal (longitudinal) direction is relieved in the vertical (widthwise) direction. As a result, expansion in the horizontal direction is suppressed without any excessive load on the jig, and no pitch offset occurs between the polymeric optical waveguides and the cores of the photoelectric conversion elements. As the result, an image reading operation can be properly performed without any pixel offset.

According to the fifth aspect of the present invention, with the use of the above thermal expansion suppressing member, even if the operating temperature changes, the thermal expansion of the polymeric optical waveguide array can be suppressed, and no great pitch offset occurs between the cores of the polymeric optical waveguide array and the elements of the photoelectric conversion element array. A pixel offset can therefore be prevented, and a proper image read operation can be performed.

Even with a thermal expansion suppressing member like the one in the fifth aspect, when the polymeric optical waveguide array thermally expands with a change in operating temperature, a strain may be produced in the core array direction of the polymeric optical waveguide array. The sixth aspect of the present invention has a structure in which such a strain can be easily relieved in a direction almost perpendicular to the core array direction of the polymeric optical waveguide array.

More specifically, the coefficient of linear thermal expansion of the thermal expansion suppressing member is set to be smaller than that of the polymeric optical waveguide array in the core array direction of the polymeric optical waveguide array to prevent a pitch offset between the cores and the elements of the photoelectric conversion element array in this direction. In addition, the coefficient of linear thermal expansion of the thermal expansion suppressing member is set to be almost equal to or larger than that of the polymeric optical waveguide array in a direction almost perpendicular to the core array direction of the polymeric optical waveguide array so that a strain in the core array direction of the polymeric optical waveguide array can be relieved in the direction perpendicular to the core array direction.

According to the sixth aspect of the present invention, therefore, with the use of the thermal expansion suppressing member having a coefficient of linear thermal expansion exhibiting anisotropy, a strain due to the thermal expansion of the polymeric optical waveguide array is relieved in the direction almost perpendicular to the core array direction of the polymeric optical waveguide array. This can suppress thermal expansion in the core array direction without posing any excessive load on the polymeric optical waveguide array, and prevent a pitch offset between the cores and the elements of the photoelectric conversion element array.

According to the seventh and eighth aspects of the present invention, with the arrangement different from that of the above sixth aspects, the above strain in the core array direction of the polymeric optical waveguide array can be suppressed. More specifically, according to the seventh and eighth aspects of the present invention, by ensuring the gap between the polymeric optical waveguide array and the thermal expansion suppressing member as described above, a strain due to the thermal expansion of the polymeric optical waveguide array can be relieved in the direction almost perpendicular to the core array direction of the polymeric optical waveguide array so as to prevent a pitch offset between the cores and the elements of the photoelectric conversion element array in the core array direction of the polymeric optical waveguide array as in the above-mentioned sixth aspect of the present invention.

According to the ninth and tenth aspects of the present invention, with the use of the thermal expansion suppressing member having the tapered inner surface, the thermal expansion suppressing member can be prevented from being detached or shifted from the polymeric optical waveguide array.

According to the eleventh and twelfth aspects of the present invention, with the use of the thermal expansion suppressing member having the corrugated inner surface, the thermal expansion suppressing member can be prevented from being detached or shifted from the polymeric optical waveguide array.

According to the thirteenth and fourteenth aspects of the present invention, since the contact surfaces of the polymeric optical waveguide array and the thermal expansion suppressing member are bonded to each other with an adhesive, even if the polymeric optical waveguide array is cooled and contracts, a pitch offset between the cores of the polymeric optical waveguide array and the elements of the photoelectric conversion element array can be prevented. In addition, when the polymeric optical waveguide array contracts in this manner, the thermal expansion suppressing member can be prevented from being detached or shifted from the polymeric optical waveguide array.

BRIEF DESCRIPTION OF THE DRAWINGS

FIGS. 7A to 7D show a thermal expansion suppressing member (jig) in this embodiment, in which

DESCRIPTION OF THE PREFERRED EMBODIMENT

An embodiment of the present invention will be described below with reference to the accompanying drawings.

In this embodiment, the present invention is applied to a one-dimensional image scanner (scan width: 256 mm; paper size: B4) having a resolution of 200 dpi and used for a Group III facsimile. However, the present invention is not limited to this.

Figure 1:
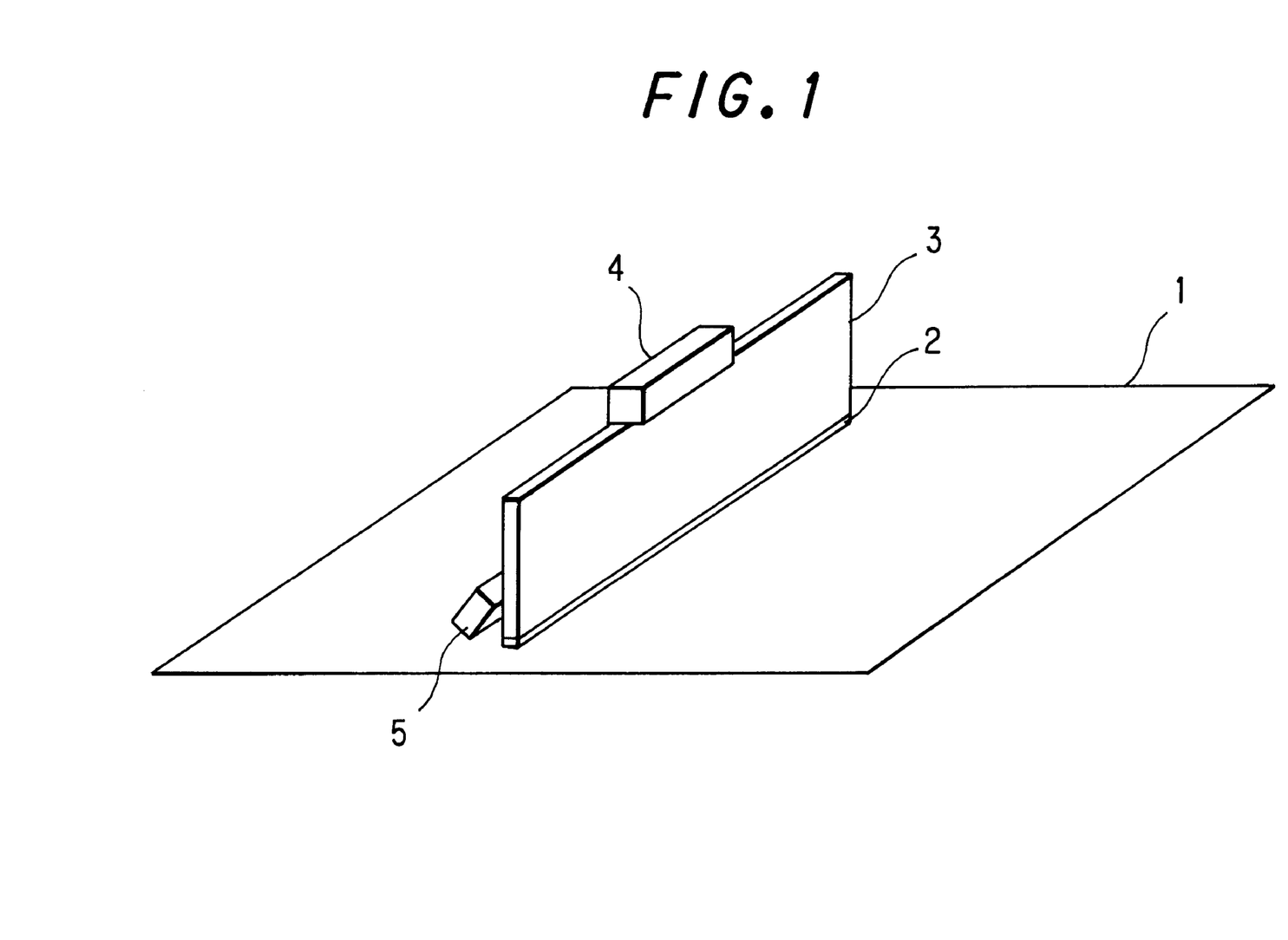
FIG. 1 is a perspective view showing how an image is read from an original by an optical waveguide reduction optical image sensor according to an embodiment of the present invention.

FIG. 1 is a schematic perspective view showing how an original image is read by the optical waveguide reduction optical image sensor of this embodiment. The optical waveguide reduction optical image sensor of the embodiment is configured by a microlens array 2, a polymeric optical waveguide array 3, a photoelectric conversion element array 4, and a linear light source 5. In this optical waveguide reduction optical image sensor, light emitted from the linear light source 5 and reflected by an original 1 is focused on each core on the incident surface of the polymeric optical waveguide array 3 by the microlens array 2. The light is then guided by each core to be incident on the photoelectric conversion element array 4, in which the light is converted into an electrical signal, thus reading the image.

In this embodiment, as the photoelectric conversion element array, $\mu$PD3743D (available from NEC Corp.), which is a CCD consisting of 2,048 pixels arranged at a pitch of 14 $\mu$m (photoelectric conversion element (pixel) pitch), is used.

Figure 2:
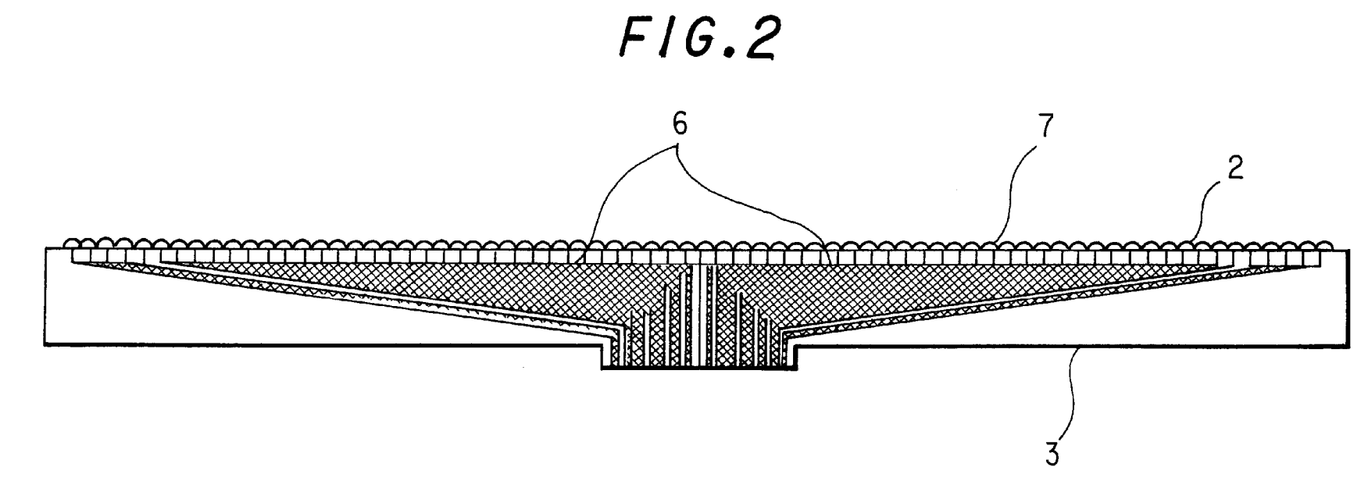
FIG. 2 is a plan view showing a polymeric optical waveguide array and a microlens array constituting the optical waveguide reduction optical image sensor in FIG. 1.

FIG. 2 is a plan view showing the microlens array 2 and the polymeric optical waveguide array 3 in FIG. 1. As shown in FIG. 2, in the optical waveguide reduction optical image sensor of this embodiment, light beams focused on cores 6 on the incident surface of the polymeric optical waveguide array 3 by microlenses 7 of the microlens array 2 are respectively guided by the cores 6 to reduce the original image. Note that plurality of the microlenses 7 are arranged into a one-dimensional array in the microlens array 2, and plurality of the cores 6 are arranged into a one-dimensional array in the polymeric optical waveguide array 3.

A method of manufacturing the polymeric optical waveguide array of this embodiment will be described herein below.

The process of manufacturing a pattern substrate which is a lower cladding substrate in which groove patterns serving as cores are formed will be described first. In this embodiment, the injection molding method disclosed in Japanese Patent Application Laid-Open Hei 7 No. 178825 was used.

The process of manufacturing a mold used for injection molding of a pattern substrate will be described first. A 9-$\mu$m thick photoresist film is formed on a glass substrate, and groove patterns are transferred onto the substrate by using a photolithographic technique. More specifically, a mask is brought into tight contact with this photoresist film and exposed to ultraviolet light to perform development. As a result, the groove patterns on the mask are transferred onto the photoresist film to form the groove patterns on the substrate. In this embodiment, since the transfer ratio in the injection molding process using the mold is about 95%, the thickness of the photoresist film is set to be slightly larger than the specification depth of each core, which is 8 $\mu$m.

Ni and Ta thin films are formed on the patterned photoresist film by sputtering. Thereafter, a 10-$\mu$m thick nickel plate is formed by an electroplating process using a nickel chloride solution. A support member is bonded to the opposite surface of the resultant thin metal plate to the pattern surface. Finally, the photoresist film is dissolved by using a resist release agent to separate the thin metal plate from the glass substrate, thereby completing the manufacture of a mold which has grooves serving as 8-$\mu$m rectangular optical waveguide cores and can be used in an injection molding machine. With the use of such a mold, a pattern substrate having groove patterns can be manufactured from a polymeric material by an injection molding technique.

Secondly, a polymer precursor for optical waveguide cores is filled in the groove portions of the pattern substrate manufactured in the above manner, and a flat substrate (0.5 $\mu$m thick) which is an upper cladding substrate is placed on the groove formation surface of the pattern substrate. After the pattern substrate and the flat substrate are held in tight contact by a clamp jig, photopolymerization of the polymer precursor for cores is caused by ultraviolet radiation. To remove core resin portions protruding from the side surfaces of the pattern substrate and the flat substrate, the side surfaces are polished by a standard polishing machine using a suspension containing diamond particles having a size of 0.5 $\mu$m or less. With this process, a polymeric optical waveguide array like the one shown in FIG. 2 is manufactured. As the core material used in this embodiment, ultraviolet curing resin TB3042 (available from Three Bonds) having a refractive index of 1.53 is used.

In this embodiment, as described above, the manufacturing method called the sandwich method is used. However, the vacuum capillary method may be used, in which after a pattern substrate is brought into tight contact with a flat substrate, a polymer precursor as a material for optical waveguide cores is filled in grooves as capillaries by capillarity, and the polymer precursor is polymerized.

First Embodiment

The joint portion between the optical waveguide substrate and the photoelectric conversion element array in FIG. 2 will be described with reference to FIGS. 3 and 4.

Note that an optical waveguide substrate 3 manufactured in this embodiment has a size of 260 mm×25 mm×2 mm, and includes 2,048 waveguides. Each processed groove of the optical waveguide substrate 3 is a reduction optical waveguide pattern having two bent portions, as shown in FIG. 2. The pitch of the incident ends of the waveguides is set to 127 $\mu$m; and the pitch of the exit ends, 4 $\mu$m. The core of each waveguide has a square cross-section, and is 8 $\mu$m wide and 8 $\mu$m deep.

Figure 3:
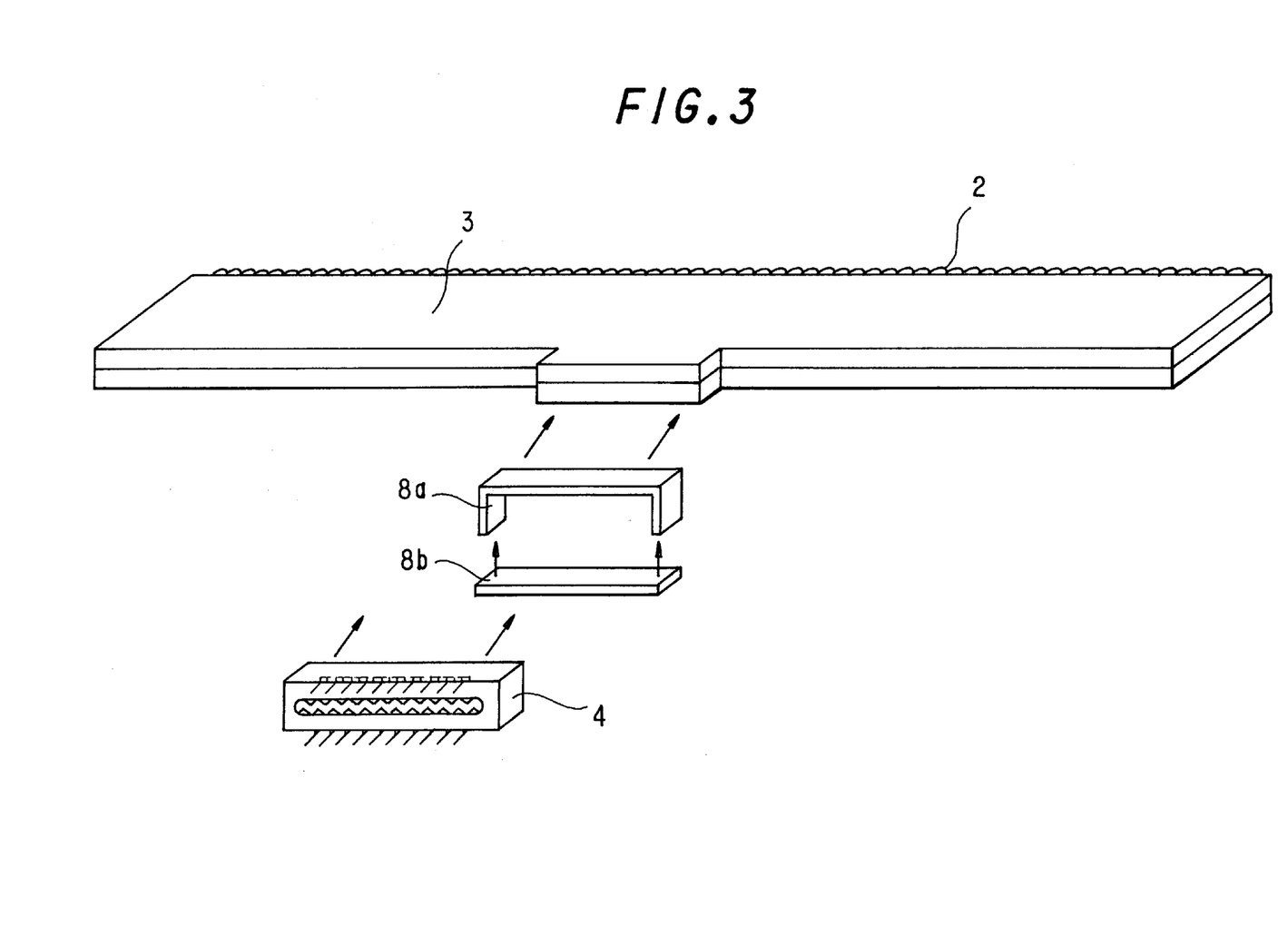
FIG. 3 is a perspective view showing the structure of a jig used for the photodetecting portion of a waveguide reduction optical image sensor according to the present invention.

FIG. 3 shows a case in which the optical waveguide substrate 3 and an photoelectric conversion element array 4 are joined to each other by using a U-shaped jig 8a and a flat jig 8b. FIG. 4 shows a case in which the optical waveguide substrate 3 and the photoelectric conversion element array 4 are joined to each other by using a rectangular jig 8.

In this embodiment, the U-shaped jig or the rectangular jig is fitted and fixed on the joint portion between the polymeric optical waveguide array of the optical waveguide substrate 3 and the photoelectric conversion element array 4 at a temperature of 20° C.

When the U-shaped jig 8a shown in FIG. 3 is to be used, the U-shaped jig 8a is fitted on the joint portion first, and the portion which is not covered with the U-shaped jig 8a is then covered with the flat jig 8b. As a result, the shape of the resultant structure becomes similar to that of the rectangular jig 8 in FIG. 4. This structure is used to prevent a strain in an optical waveguide substrate 6 which is caused if one side of the join portion is not held.

Note that since the U-shaped jig 8a can be fitted on the join port either from above or from the side, the jig can be easily fitted and fixed on the joint portion from a desired direction.

In the optical waveguide reduction optical image sensor of this embodiment, the U-shaped or rectangular jig is fitted on the joint portion between the polymeric optical waveguide array on the optical waveguide substrate 3 and the photoelectric conversion element array 4 for detecting reflected light from an original 1 and converting it into an electrical signal. This structure prevents the pitches of the photoelectric conversion elements and the cores from changing with changes in temperature. Note that this jig is made of a member having the same coefficient of linear thermal expansion as that of each photoelectric conversion element.

In this case, the inner width of the U-shaped jig 8a and the rectangular jig 8 is equal to that of the optical waveguide substrate 6, which is 30 mm. The inner length of the jigs is, however, larger by 4 $\mu$m on each of the upper and lower sides than the thickness of the optical waveguide substrate 6, which is 2 mm, so that a pitch offset caused by expansion of the optical waveguide substrate 6 in the vertical direction can be suppressed to ½ the depth of each core, which is 8 $\mu$m. In addition, the depth of each jig is set to 5 mm so that a strain caused in the horizontal direction can be relieved in the vertical direction as much as possible.

The U-shaped jig 8a and the rectangular jig 8 are made of a material having the same coefficient of linear thermal expansion as that of the photoelectric conversion element array 4. For example, since the silicon portion of the photoelectric conversion element array 4 has a coefficient of linear thermal expansion of about $3 \times 10^{-6}/°$ C., a ceramic member or the like having a coefficient of linear thermal expansion of about 2 to $9 \times 10^{-6}/°$ C. can be used. This embodiment uses SIALON having a coefficient of $3.0 \times 10^{-6}/°$ C., i.e., a compound ceramic member consisting of Si, Al, O, and N.

A microlens array 7 made of PMMA is bonded to the incident ends of the optical waveguides, and the photoelectric conversion element array 4 is bonded to the exit end faces of the optical waveguides by using an ultraviolet curing resin. In this case, each microlens of the microlens array 7 has a diameter of 125 $\mu$m, and $\mu$PD3743D (available from NEC Corp.), which is a CCD consisting of 2,048 pixels arranged at a pitch of 14 $\mu$m, is used as the photoelectric conversion element array 4.

A light-limiting member must be mounted on the waveguide end faces to prevent crosstalk between the adjacent waveguides. For this reason, a reflecting metal film is formed on an end face of the cladding substrate by vapor deposition or sputtering, or the end face is coated with an organic film containing a coloring agent that absorbs light from an LED.

Figure 5:
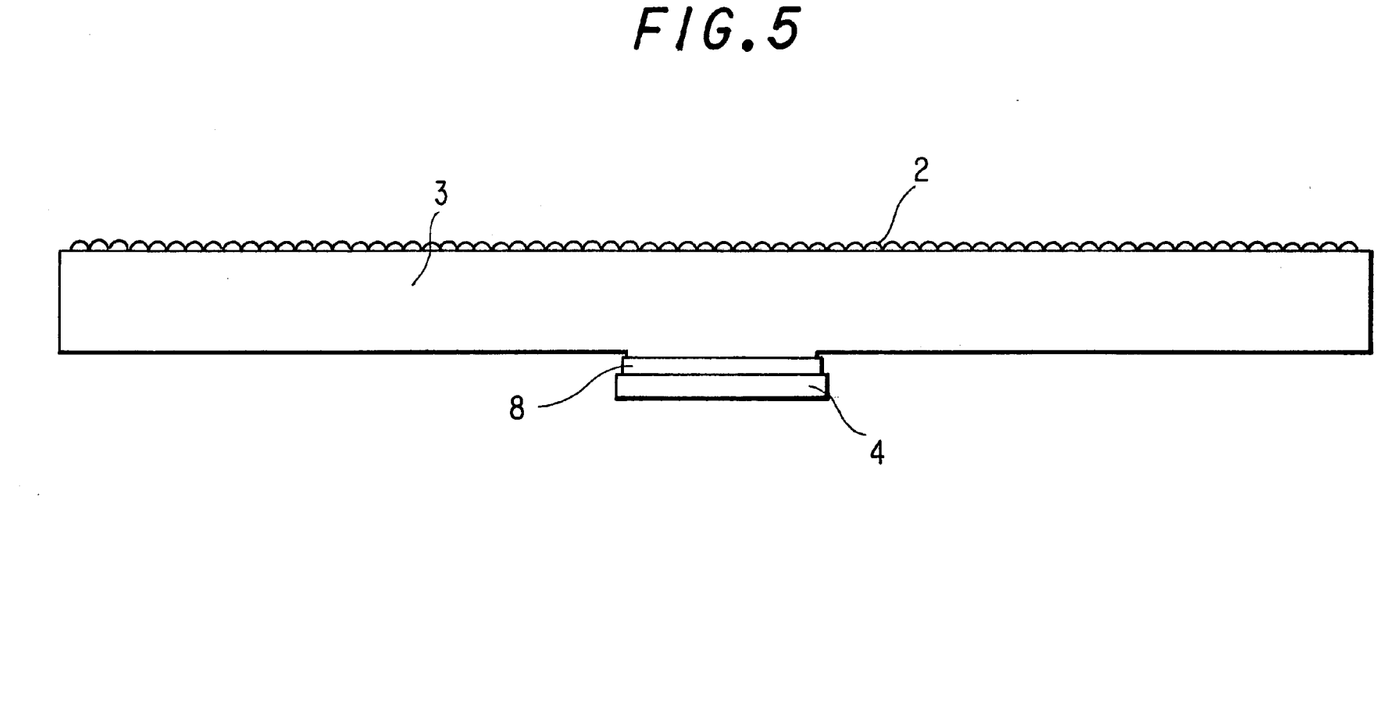
FIG. 5 is a plan view showing an optical waveguide reduction optical image sensor in which a thermal expansion suppressing member (jig) and a photoelectric conversion element array are mounted on a polymeric optical waveguide array and a microlens array according to another embodiment of the present invention.
Figure 6:
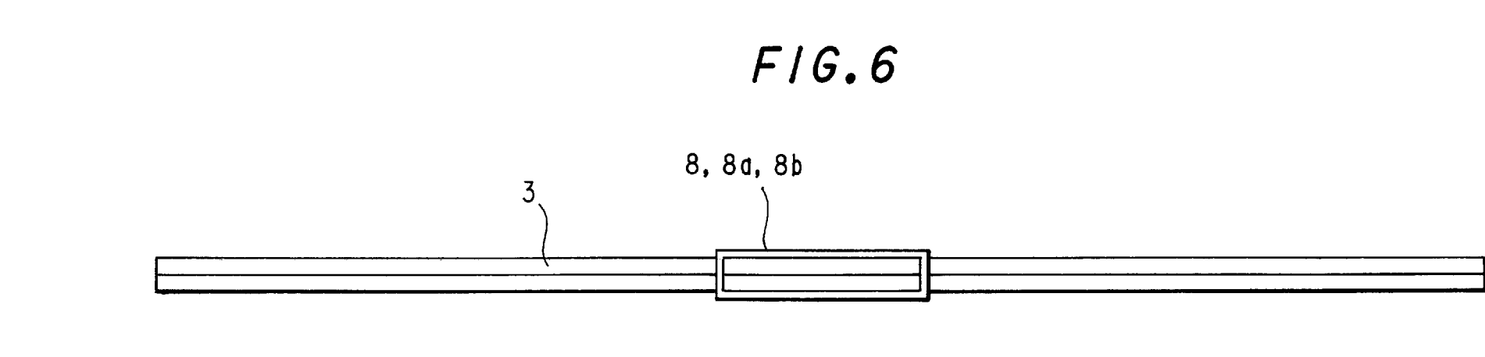
FIG. 6 is a sectional view showing the photodetecting portion of the waveguide reduction optical image sensor according to the present invention.

In this manner, the photoelectric conversion element array 4 is bonded to the exit end side of the optical waveguides of the optical waveguide substrate 3 through the rectangular jig 8a or the rectangular jig 8. In addition, the microlens array 7 is bonded to the incident end side of the optical waveguides. As a result, an optical waveguide reduction optical image sensor whose outer appearance is shown FIGS. 5 and 6 is obtained.

The effects of this optical waveguide reduction optical image sensor will be described next in comparison with a conventional image sensor using polymeric optical waveguides. Assume that the conventional image sensor in this case has neither the U-shaped jig 8a nor the rectangular jig 8 fitted on the join portion between the optical waveguide array and the photoelectric conversion element array.

More specifically, light emitted from the light source and reflected by an original was incident on the incident ends of the cores of the polymeric optical waveguides of each image sensor, and the intensity of light emerging from each polymeric optical waveguide was detected by a corresponding photoelectric conversion element, thereby receiving an image. The influences of temperature changes on the two image sensors were then compared with each other. Note that the temperature was raised from 20° C. to 70° C. in a clean oven.

In the conventional image sensor, PMMA as a polymeric material for each optical waveguide had a coefficient of linear thermal expansion of $7 \times 10^{-6}/°$ C., which greatly differed from the coefficient of linear thermal expansion of each photoelectric conversion element. For this reason, the pitches of the photoelectric conversion elements and the cores of the optical waveguides changed, and an offset corresponding to about three pixels occurred at each end of the photoelectric conversion element array when its middle portion was fixed. As a result, the resolution decreased, and the resultant image has poor contrast.

In contrast to this, in the optical waveguide reduction optical image sensor of this embodiment, even when each optical waveguide and each photoelectric conversion element were made of materials having different coefficients of linear thermal expansion, since the jig was fitted on the joint portion between the optical waveguide array and the photoelectric conversion element array, expansion in the horizontal direction was suppressed. In addition, since a strain in the horizontal direction was relieved in the vertical direction, expansion in the horizontal direction could be suppressed without excessive load on the jig. As a result, a proper read operation without any pixel offset could be performed, thereby obtaining an image with a high resolution and excellent contrast.

Second Embodiment

The joint portion between the polymeric optical waveguide array and the photoelectric conversion element array of the second embodiment of the present invention will be described next with reference to FIGS. 4, 5, 7, and 8.

Figure 4:
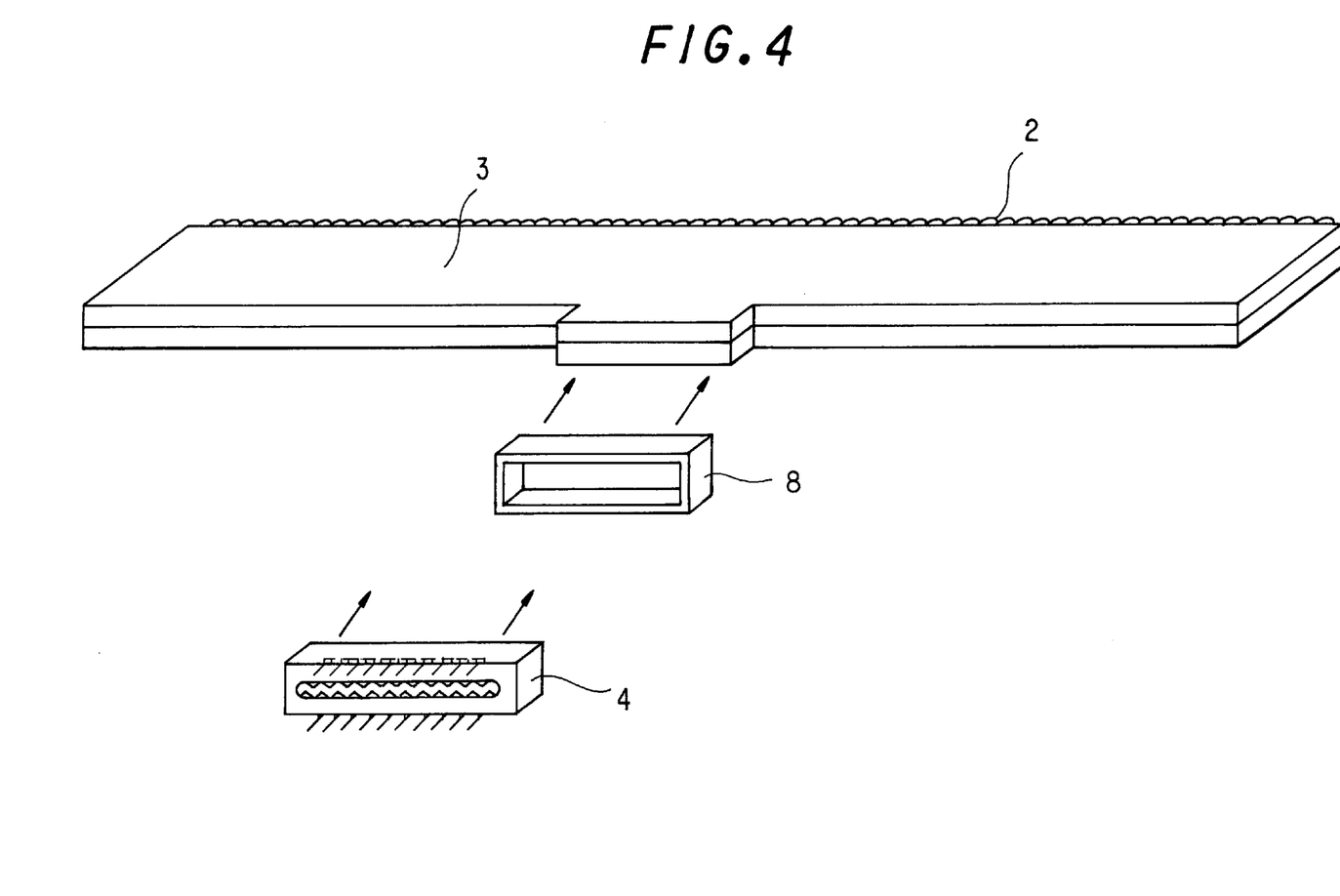
FIG. 4 is a schematic perspective view showing how a thermal expansion suppressing member (jig) and a photoelectric conversion element array are mounted on the polymeric optical waveguide array and the microlens array in FIG. 2.

As shown in the perspective view of FIG. 4, according to the process of this embodiment, a thermal expansion suppressing member (jig) 8 which is a hollow member having a rectangular cross-section is fitted and fixed on the joint portion between an polymeric optical waveguide array 3 and a photoelectric conversion element array 4, and the photoelectric conversion element array 4 is bonded to the exit end face of the polymeric optical waveguide array 3.

Note that a pattern substrate manufactured in this embodiment uses PMMA (refractive index: 1.49) as a polymeric material, and has a size of 260 mm×25 mm×1.5 mm. Each groove formed in this substrate has two bent portions, as shown in FIG. 2. The pitch of the incident ends of the grooves is set to 125 $\mu$m, and the pitch of the exit ends of the grooves is set to 14 $\mu$m. Both the width and depth of each groove are set to 8 $\mu$m such that the core has a square cross-section.

Figure 7A:
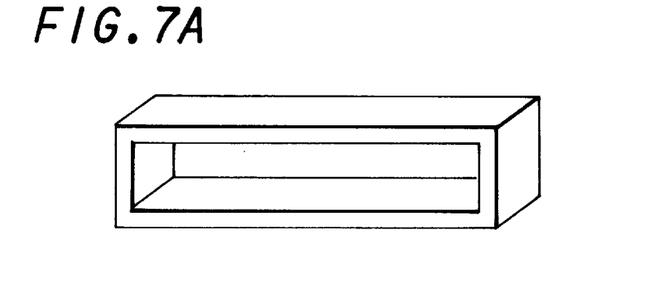
FIG. 7A is a perspective view of the member.

The shape of the thermal expansion suppressing member 8 will be described with reference to the perspective view of FIG. 7A, the plan view of FIG. 7B, the front view of FIG. 7C, and the rear view of FIG. 7D. As shown in the plan view of FIG. 7B, the thermal expansion suppressing member 8 of this embodiment has a tapered shape tapering toward the photoelectric conversion element array. The inner size of the thermal expansion suppressing member 8 in the core array direction (longitudinal direction in FIG. 7B) of the optical waveguide array decreases from 30+0.2 mm as shown in the rear view of FIG. 7D to 30−0.2 mm as shown in the front view of FIG. 7C, because the size of the joint portion between the polymeric optical waveguide array and the photoelectric conversion element array in the core array direction is 30 mm. This tapered shape can prevent the thermal expansion suppressing member from being detached or shifted from the polymeric optical waveguide array.

Figure 7B:
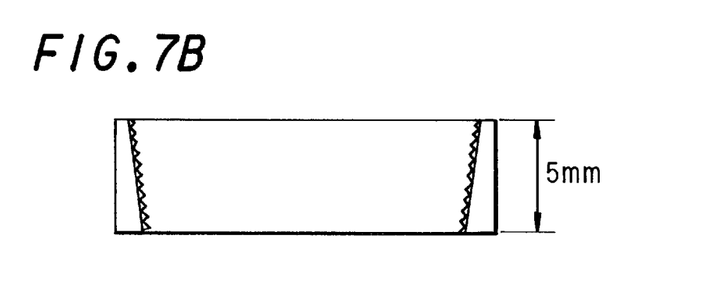
FIG. 7B is a plan view of the member.
Figure 7C:
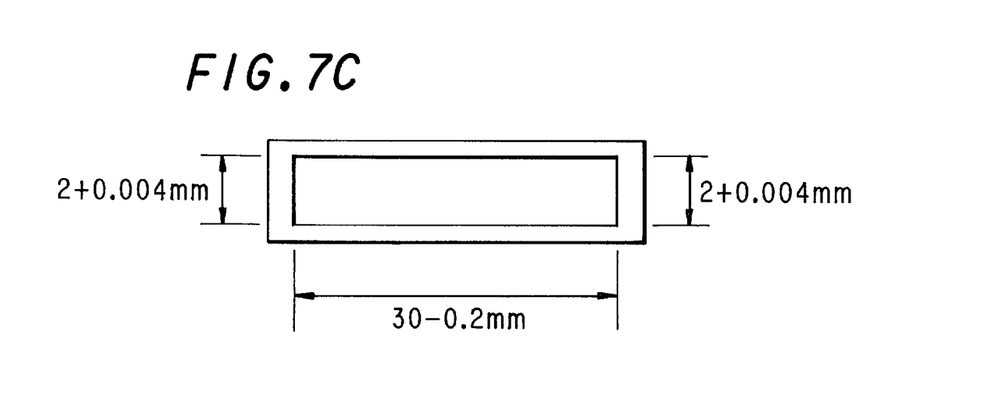
FIG. 7C is a front view of the member.
Figure 7D:
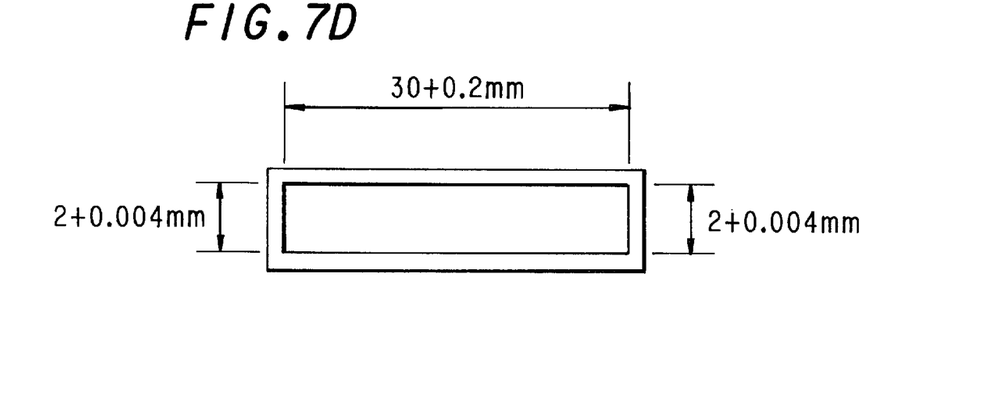
FIG. 7D is a rear view of the member.

The inner size of the thermal expansion suppressing member in a direction (in the vertical direction on the drawing (the widthwise direction)) perpendicular to the core array direction is set to 2+0.004 mm, which is larger than the size of the joint portion between the polymeric optical waveguide array and the photoelectric conversion element array, which is 2 mm, by 4 $\mu$m, as shown in FIGS. 7D and 7C. The inner size of the thermal expansion suppressing member is set to be larger than the size of the polymeric optical waveguide array in the vertical direction on the drawing (widthwise direction) in this manner to ensure a gap between the contact surfaces. With this gap, when the polymeric optical waveguide array thermally expands, a strain in the core array direction can be relieved in the vertical direction on the drawing (widthwise direction), thereby preventing such a strain.

As shown in the plan view of FIG. 7B, the depth of the thermal expansion suppressing member 8 is set to 5 mm. With this depth, the pitch offset between the polymeric optical waveguide array and the photoelectric conversion element array due to the thermal expansion of the polymeric optical waveguide array can be suppressed to ½ or less the depth of each core, which is 8 $\mu$m, and a strain in the polymeric optical waveguide array in the horizontal direction on the drawing (longitudinal direction) can also be relieved.

In addition, as shown in the plan view of FIG. 7B, the surface of the thermal expansion suppressing member 8 of this embodiment which is in contact with the polymeric optical waveguide array has a corrugated shape to prevent the thermal expansion suppressing member from shifting toward the photoelectric conversion element array.

Referring to FIG. 7B, the tapered shape and the corrugated shape are clearly drawn with the solid lines for easy identification.

The coefficients of linear thermal expansion of the polymeric optical waveguide array, the photoelectric conversion element array, and thermal expansion suppressing member will be described below.

A CCD which is a photoelectric conversion element array is mainly constituted by a silicon wafer substrate and a package resin. The coefficient of linear thermal expansion ($d_s$) of the silicon portion exhibits no anisotropy and is about $3\times10^{-6}$/° C., and the coefficient of linear thermal expansion ($d_p$) of the resin material for the package exhibits no anisotropy and is about $1\times10^{-5}$/° C. The silicon portion on the package is pulled within a range of 0 to 70° C. and expands and contracts to the same extent as the package. The coefficient of linear thermal expansion ($d_s$) of PMMA as a material for a lower cladding substrate (pattern substrate) occupying most of the polymeric optical waveguide array and an upper cladding substrate (flat substrate) exhibits no anisotropy and is about $7\times10^{-5}$/° C.

If, therefore, the coefficient of linear thermal expansion of the thermal expansion suppressing member is smaller than that of PMMA in the core array direction, the thermal expansion of PMMA can be suppressed. If the coefficient of linear thermal expansion of the thermal expansion suppressing member in a direction perpendicular to the core array direction is set to be equal or larger than that of PMMA, a strain caused in the core array direction when PMMA thermally expands can be relieved in this direction.

In this embodiment, therefore, a liquid crystal polymer (Vectra A230 (available from Polyplastic K.K.)) whose coefficient of linear thermal expansion exhibits anisotropy, and is about $2\times10^{-6}$/° C. in the core array direction, which is smaller than that of PMMA, and is about $5\times10^{-5}$/° C. in a direction perpendicular to the core array direction, which is almost equal to that of PMMA is used as a material for the thermal expansion suppressing member.

After the above thermal expansion suppressing member is fitted on the joint portion between the polymeric optical waveguide array and the photoelectric conversion element array at room temperature (about 20° C.), an adhesive is injected between the polymeric optical waveguide array and the photoelectric conversion element array 4 and polymerized. This process is performed to prevent a pitch offset between the polymeric optical waveguide array and the photoelectric conversion element array or prevent the thermal expansion suppressing member from being detached or shifted from the polymeric optical waveguide array when the polymeric optical waveguide array contracts with a drop in room temperature. As this adhesive, a material which exhibits a small elongation percentage with respect to a change in temperature and has a large Young's modulus is suitably used. For this reason, ultraviolet curing resin TB3042 (available from Three Bonds) which is identical to the core material for the photoelectric conversion element array is used in this embodiment.

Figure 8:
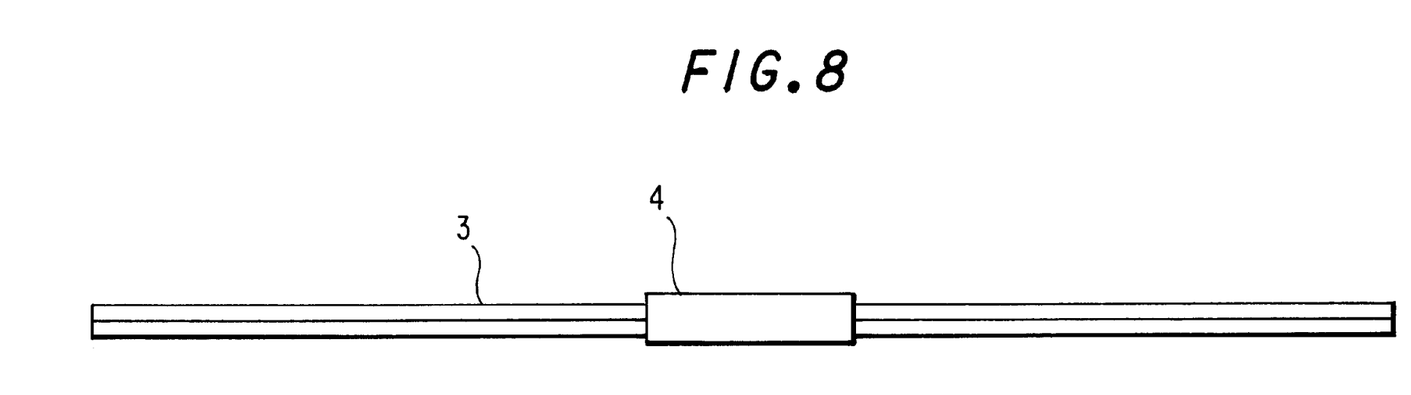
FIG. 8 is a front view of the optical waveguide reduction optical image sensor in FIG. 5.

As shown in the plan view of FIG. 5 and the front view of FIG. 8, a microlens array 2 made of PMA and the photoelectric conversion element array 4 are respectively bonded to the incident and exit end faces of the polymeric optical waveguide array 3 by using an ultraviolet curing resin. In this embodiment, the diameter of each microlens of the microlens array 2 is set to 125 $\mu$m. In addition, as the photoelectric conversion element array 4, $\mu$PD3743D (available from NEC Corp.), which is a CCD consisting of 2,048 pixels arranged at a pitch of 14 $\mu$m (photoelectric conversion element (pixel) pitch), is used, as the same as the preceding embodiments.

As a comparative example, an optical waveguide reduction optical image sensor was manufactured to have the same structure as that of the optical waveguide reduction optical image sensor of this embodiment except that the thermal expansion suppressing member 8 was not formed.

Light reflected by an original 1 was incident from the microlens array 2 side, and the intensity of light emerging from the photoelectric conversion element array 4 through the polymeric optical waveguide array 3 was subsequently detected in each of the optical waveguide reduction optical image sensors according to this embodiment and the comparative example. The influences of temperature changes on the image receiving operations of the two image sensors were then compared on the basis of the detection results. Note that the operating temperature was set by using a clean oven within the range of room temperature (about 20° C.) to 70° C.

In the optical waveguide reduction optical image sensor as the comparative example, as described above, the coefficient of linear thermal expansion of PMMA as a polymeric material for the lower cladding substrate (pattern substrate) and the upper cladding substrate (flat substrate) was about $7 \times 10^{-5}$/° C., which greatly differed from that of the CCD as the photoelectric conversion element array. For this reason, the core pitch of the polymeric optical waveguide array greatly differed from the pixel pitch of the photoelectric conversion element array. When, therefore, the middle portion of the joint portion was fixed, a pixel offset corresponding to about three pixels occurred at each end of the joint portion. As a result, the read image in this case was poor in resolution and contrast.

In contrast to this, in the optical waveguide reduction optical image sensor of this embodiment, with the use of the above thermal expansion suppressing member, even if the coefficient of linear thermal expansion of the polymeric optical waveguide array differed from that of the photoelectric conversion element array, the thermal expansion of the polymeric optical waveguide array in the core array direction could be suppressed, and the difference between the core pitch of the polymeric optical waveguide array and the pixel pitch of the photoelectric conversion element array could be suppressed to about 0.5 pixel. Therefore, an image with high resolution and excellent contrast could be read.

In this case, since the thermal expansion suppressing member had a coefficient of linear thermal expansion that exhibited anisotropy as described above, the thermal expansion of the polymeric optical waveguide array in the core array direction was relieved in a direction perpendicular to the core array direction. No excessive load and no distortion was imposed on the polymeric optical waveguide array and hence the thermal expansion suppressing member. The thermal expansion of the polymeric optical waveguide array in the core array direction can therefore be suppressed. In addition, with the gap between the contact surfaces of the polymeric optical waveguide array and the photoelectric conversion element array in the direction perpendicular to the core array direction, a strain due to the thermal expansion of the polymeric optical waveguide array in the core array direction could be relieved in the direction perpendicular to the core array direction. Therefore, the thermal expansion of the polymeric optical waveguide array in the core array direction could be suppressed without imposing excessive loads and hence any distortion of the polymeric optical waveguide array and the thermal expansion suppressing member.

Furthermore, since the contact surfaces of the polymeric optical waveguide array and the thermal expansion suppressing member were bonded to each other with an adhesive as described above, even when the polymeric optical waveguide array was cooled, the pitch offset between the polymeric optical waveguide array and the photoelectric conversion element array could be suppressed. In addition, the thermal expansion suppressing member could be prevented from being detached or shifted from the polymeric optical waveguide array. In this embodiment, as the hollow member, the member having a rectangular cross-section is used. However, a member having a U-shaped cross-section may be used.

As described in detail above, according to the first aspect of the present invention, an optical waveguide reduction optical image sensor for reducing light from an original surface by using a polymeric optical waveguide array, is so configured that a joint portion between a polymeric optical waveguide array and a photoelectric conversion element array for detecting light propagating through an optical waveguide and converting the detected light into an electrical signal is fixed with a jig, thereby preventing a pixel offset. Even if, therefore, the surrounding temperature changes, a change in pitch between the cores of the polymeric optical waveguide array and the elements of the photoelectric conversion element array can be suppressed, and an image having excellent contrast without any pixel offset can be obtained.

According to the second aspect of the present invention, the jig has a U shape or rectangular shape which covers the joint portion between the polymeric optical waveguide array and the photoelectric conversion element array. With this arrangement, the polymeric optical waveguides and the photoelectric conversion elements can be easily coupled to each other.

According to the third aspect of the present invention, the jig ensures a gap in a vertical direction. With this arrangement, expansion in the horizontal direction can be suppressed without any excessive load on the jig.

According to the fourth aspect of the present invention, the jig is formed by using a member having the same coefficient of linear thermal expansion as that of the photoelectric conversion element array. With this arrangement, the linear thermal expansion of the photoelectric conversion element array is in conformity with that of the jig to reduce the load imposed on the jig.

According to the fifth aspect of the present invention, in an optical waveguide reduction optical image sensor, a thermal expansion suppressing member (jig) having a coefficient of linear thermal expansion smaller than that of a polymeric optical waveguide array in the core array direction of the polymeric optical waveguide array is used. Even if, therefore, the operating temperature changes, the thermal expansion of the polymeric optical waveguide array can be suppressed, and no great pitch offset occurs between the cores of the polymeric optical waveguide array and the elements of the photoelectric conversion element array. This prevents the occurrence of a pixel offset, and allows proper image read.

According to the sixth aspect of the present invention, a thermal expansion suppressing member (jig) having a coefficient of linear thermal expansion which exhibits anisotropy and is substantially equal to or larger than that of the polymeric optical waveguide array in a direction substantially perpendicular to the core array direction of the thermal expansion suppressing member is used. With the use of this member, a strain due to the thermal expansion of the polymeric optical waveguide array is relieved in the direction substantially perpendicular to the core array direction of the polymeric optical waveguide array, thereby suppressing thermal expansion in the core array direction and preventing a pitch offset between the cores and the elements of the photoelectric conversion element array without imposing any excessive load on the polymeric optical waveguide array.

According to the seventh and eighth aspects of the present invention, a gap is ensured between the polymeric optical waveguide array and the thermal expansion suppressing member (jig) in a direction substantially perpendicular to the core array direction of the polymeric optical waveguide array. With this arrangement, a strain due to the thermal expansion of the polymeric optical waveguide array can be relived in the direction substantially perpendicular to the core array direction of the polymeric optical waveguide array so as to prevent a pitch offset between the cores and the elements of the photoelectric conversion element array in the core array direction of the polymeric optical waveguide array.

According to the ninth and 10th aspects of the present invention, a thermal expansion suppressing member (jig) having a tapered inner surface is used to prevent the thermal expansion suppressing member from being detached or shifted from the polymeric optical waveguide array.

According to the 11th and 12th aspects of the present invention, a thermal expansion suppressing member (jig) having a corrugated inner surface is used to prevent the thermal expansion suppressing member from being detached or shifted from the polymeric optical waveguide array.

According to the 13th and 14th aspects of the present invention, since the contact surfaces of the polymeric optical waveguide array and the thermal expansion suppressing member (jig) are bonded to each other with an adhesive, even if the polymeric optical waveguide array is cooled, a pitch offset between the cores of the polymeric optical waveguide array and the elements of the photoelectric conversion element array can be suppressed, and the thermal expansion suppressing member can be prevented from being detached or shifted from the polymeric optical waveguide array.

What is claimed is:

1. An optical waveguide reduction optical image sensor for reducing light from an original surface by using a polymeric optical waveguide array,
    characterized in that a joint portion between a polymeric optical waveguide array and a photoelectric conversion element array for detecting light propagating through an optical waveguide and converting the detected light into an electrical signal is fixed with a jig, thereby preventing a pixel offset.

2. An optical waveguide reduction optical image sensor according to claim 1, wherein said jig has a U shape or rectangular shape which covers said joint portion between said polymeric optical waveguide array and said photoelectric conversion element array.

3. An optical waveguide reduction optical image sensor according to claim 1, wherein said jig ensures a gap in a vertical direction.

4. An optical waveguide reduction optical image sensor according to claim 1, wherein said jig is formed by using a member having the same coefficient of linear thermal expansion as that of said photoelectric conversion element array.

5. An optical waveguide reduction optical image sensor comprising a polymeric optical waveguide array having a plurality of cores arranged into a one-dimensional array in a cladding substrate and serving to reduce an image by guiding light reflected by an original surface through the cores, and a photoelectric conversion element array having a plurality of photoelectric conversion elements arranged into a one-dimensional array, which detect light propagating through said photoelectric conversion element array and converts the detected light into an electrical signal,
    characterized in that a hollow thermal expansion suppressing member is mounted on a joint portion between said polymeric optical waveguide array and said photoelectric conversion element array, and a coefficient of linear thermal expansion of said thermal expansion suppressing member in a core array direction of said polymeric optical waveguide array is smaller than a coefficient of linear thermal expansion of said polymeric optical waveguide array in the same direction.

6. An optical waveguide reduction optical image sensor according to claim 5, wherein said thermal expansion suppressing member has a coefficient of linear thermal expansion exhibiting anisotropy, and a coefficient of linear thermal expansion of said thermal expansion suppressing member in a direction substantially perpendicular to the core array direction of said photoelectric conversion element array is substantially equal to or larger than a coefficient of linear thermal expansion of said polymeric optical waveguide array in the same direction.

7. An optical waveguide reduction optical image sensor according to claim 5, wherein a gap is ensured between said polymeric optical waveguide array and said thermal expansion suppressing member in a direction substantially perpendicular to the core array direction of said polymeric optical waveguide array.

8. An optical waveguide reduction optical image sensor according to claim 6, wherein a gap is ensured between said polymeric optical waveguide array and said thermal expansion suppressing member in a direction substantially perpendicular to the core array direction of said polymeric optical waveguide array.

9. An optical waveguide reduction optical image sensor according to claim 6, wherein an inner surface of said thermal expansion suppressing member has a corrugated portion.

10. An optical waveguide reduction optical image sensor according to claim 6, wherein an inner surface of said thermal expansion suppressing member has a tapered shape.

11. An optical waveguide reduction optical image sensor according to claim 6, wherein contact surfaces of said polymeric optical waveguide array and said thermal expansion suppressing member are bonded to each other with an adhesive.

12. An optical waveguide reduction optical image sensor according to claim 5, wherein an inner surface of said thermal expansion suppressing member has a tapered shape.

13. An optical waveguide reduction optical image sensor according to claim 5, wherein contact surfaces of said polymeric optical waveguide array and said thermal expansion suppressing member are bonded to each other with an adhesive.

14. An optical waveguide reduction optical image sensor according to claim 5, wherein an inner surface of said thermal expansion suppressing member has a corrugated portion.

* * * * *